United States Patent
Colmer et al.

(10) Patent No.: US 8,140,939 B2
(45) Date of Patent: Mar. 20, 2012

(54) FLASH ERROR CORRECTION

(75) Inventors: Morgan Colmer, Cambridge (GB); Robert Macaulay, Cambridge (GB)

(73) Assignee: GS IP Limited Liability Company, Wilmington, DE (US)

( * ) Notice: Subject to any disclaimer, the term of this patent is extended or adjusted under 35 U.S.C. 154(b) by 985 days.

(21) Appl. No.: 11/913,259

(22) PCT Filed: Jul. 6, 2006

(86) PCT No.: PCT/GB2006/002507
§ 371 (c)(1),
(2), (4) Date: May 9, 2008

(87) PCT Pub. No.: WO2007/010189
PCT Pub. Date: Jan. 25, 2007

(65) Prior Publication Data
US 2008/0235560 A1    Sep. 25, 2008

(30) Foreign Application Priority Data

Jul. 15, 2005 (GB) .................................. 0514610.5

(51) Int. Cl.
*G11C 29/00* (2006.01)
(52) U.S. Cl. ...................... 714/764; 714/763
(58) Field of Classification Search ................. 714/763, 714/764
See application file for complete search history.

(56) References Cited

U.S. PATENT DOCUMENTS

| 5,063,565 | A |   | 11/1991 | Takayoshi |         |
|-----------|---|---|---------|-----------|---------|
| 5,603,001 | A |   | 2/1997  | Hiroshi   |         |
| 6,256,762 | B1| * | 7/2001  | Beppu     | 714/763 |
| 2004/0158675 | A1 | * | 8/2004 | Hirose | 711/115 |
| 2005/0154964 | A1 | * | 7/2005 | Vityaev | 714/769 |

FOREIGN PATENT DOCUMENTS

| JP | 64-007816 | 1/1989 |
| JP | 07-146825 | 6/1995 |
| JP | 08-139615 | 5/1996 |
| JP | 10-207786 | 8/1998 |
| JP | 11-272568 | 10/1999 |
| JP | 2004-055098 | 2/2004 |
| JP | 2004-164634 | 6/2004 |
| WO | 97/00559 | 1/1997 |

* cited by examiner

*Primary Examiner* — Sam Rizk (57) ABSTRACT

A data processing device for detecting and correcting data errors of a re-writable memory via an error correction algorithm. In one embodiment, the data processing device includes a coding unit implemented in hardware and an error correction unit implemented in software. In one embodiment, the coding unit is capable receiving a first set of data to be written to the memory and processing that data in accordance with an error correction algorithm to form a second set of data. The second set of data may be output to memory. In one embodiment, the coding unit receives data from the memory and processes that data in accordance with the error correction algorithm to determine whether the data contains an error. In one embodiment, the error correction unit receives data that contains an error and produces corrected data via an error correction algorithm. The corrected data may be output to the memory.

25 Claims, 5 Drawing Sheets

| | D0 | D1 | D2 | D3 | D4 | D5 | D6 | D7 |
|---|---|---|---|---|---|---|---|---|
| N+3 | b7 w255 | b7 w511 | | | | | | b7 w2047 |
| | ⋮ | ⋮ | ⋮ | ⋮ | ⋮ | ⋮ | ⋮ | ⋮ |
| | b1 w192 | b1 w448 | | | | | | b1 w1984 |
| | b0 w192 | b0 w448 | | | | | | b0 w1984 |
| N+2 | b7 w191 | b7 w447 | | | | | | b7 w1983 |
| | ⋮ | ⋮ | ⋮ | ⋮ | ⋮ | ⋮ | ⋮ | ⋮ |
| | b1 w128 | b1 w384 | | | | | | b1 w1920 |
| | b0 w128 | b0 w384 | | | | | | b0 w1920 |
| N+1 | b7 w127 | b7 w383 | | | | | | b7 w1919 |
| | ⋮ | ⋮ | ⋮ | ⋮ | ⋮ | ⋮ | ⋮ | ⋮ |
| | b1 w64 | b1 w320 | | | | | | b1 w1856 |
| | b0 w64 | b0 w320 | | | | | | b0 w1856 |
| Sector N | b7 w63 | b7 w319 | b7 w575 | | | | | |
| | ⋮ | ⋮ | ⋮ | ⋮ | ⋮ | ⋮ | ⋮ | ⋮ |
| | b1 w1 | b1 w256 | b1 w512 | | | | | |
| | b0 w0 | b0 w256 | b0 w512 | | | | | |

FLASH ERROR CORRECTION

CROSS-REFERENCE TO RELATED APPLICATIONS

This application is a 35 U.S.C. §371 application based on PCT Patent Application No. PCT/GB2006/002507, filed Jul. 6, 2006, entitled "FLASH MEMORY ERROR CORRECTION", which claims priority to Great Britain Patent Application No. 0514610.5, filed Jul. 15, 2005, entitled "ERROR CORRECTION FOR FLASH MEMORY." Each of the above-identified patent applications are incorporated herein by reference.

BACKGROUND

Flash memory is a form of non-volatile memory that can be electrically erased and reprogrammed. It is incorporated into a wide range of consumer products, such as digital audio players, digital cameras and mobile phones. However, all flash memories suffer from the disadvantage that they can only withstand a finite number of erase cycles. With the die area of flash memories becoming larger all the time, the statistical probability of any given bit in the memory becoming damaged increases.

For bulk storage applications, the popular choice is NAND flash because of the increased data density compared with NOR flash. The chief drawback with using NAND flash is that the individual bits of bytes cannot be randomly accessed. Instead, the device is arranged like a hard disc drive into 512 byte sectors. When a flash IC is manufactured and tested, it is expected that some of these sectors will be damaged due to the process and so extra sectors are available to replace those lost to general semiconductor yield issues. Often there is a complex controller that makes this process invisible to the outside, and typically there are 2% extra sectors available for this. A typical NAND flash sector can be reprogrammed about 10000 times.

Because of the inherent limited endurance of flash memories, many manufacturers put some simple error correction into the memory. Typically they use Hamming codes and increase the sector size by a further 16 bytes to accommodate the error correction overhead, but this data space is not available to the outside system. All of these techniques require extra die area on the flash device to perform these functions.

Using the error correction, the flash memory can correct only one bit in one sector (1 bit in 4096 bits) and detect 2 bits in error per sector. Flash manufacturers claim that this is sufficient for most purposes; however, some filing systems can cause the level of damage sustained by certain sectors to be greatly increased, causing the product to fail in a short period of time.

Filing systems, such as FAT16 and FAT32, save two copies of a table that is used to tell the host processor where everything is stored on the device. Every time any part of the bulk memory is changed, the filing system causes the two copies of this essential data to be re-written. In NAND flash memory, a single location or byte cannot be individually erased and so an entire block (covering several sectors) must be formatted and re-written each time part of the bulk memory is changed. This causes premature failures to many devices such as thumb drives.

One solution to this problem is to ensure that certain frequently accessed data items are not written back to the same area of the flash memory but rotate around the memory to spread the "wear and tear" over the entire device.

Clearly, manufacturers do not want to be constantly increasing the level of in-built sophistication of flash drives as this increases the cost without necessarily giving a perceived benefit to the user. Flash manufacturers are also unlikely to want to make a big issue about the inherent unreliability of their products.

One problem faced by consumer audio manufacturers is that their costs are increasingly linked to commodity memory market pricing. As the popularity of digital media grows, so this trend will increase. However, end customers do not allow their audio suppliers to factor this memory price fluctuation into their buy-price (as is the case in the PC market) and this leaves the audio suppliers exposed to the fickle whims and trends of the memory market.

The consumer audio industry has sought ways of overcoming this and recycling of memory has become commonplace. DRAM, another commodity memory product, is frequently salvaged from old SIMMS and often at a fraction of the ambient market prices. With a revolution in NAND flash demand from the audio electronics industry poised to happen, it seems likely that this type of memory product will also be targeted by component recycling companies.

Recycled flash memory will be characterized by a number of factors: (i) older technology and (ii) higher probability of defective sectors. Any flash controller entering the market should be adapted to deal with these disadvantages so that it can be used with recycled flash memory.

SUMMARY OF THE DISCLOSURE

According to a first aspect of the disclosure, there is provided a data processing device for applying an error correction algorithm to data written to and data read from a re-writable memory, the data processing device comprising a coding unit implemented in hardware, the coding unit being capable of performing a coding operation in which it receives a first set of data to be written to the memory, processes that data in accordance with the error correction algorithm to form a second set of data and outputs the second set of data for writing to the memory, and an error detection operation in which it receives data read from the memory and processes that data in accordance with the error correction algorithm to determine whether the read data contains an error and an error correction unit implemented in software, the error correction unit being arranged to receive read data that contains an error, process that data in accordance with the error correction algorithm to correct said error and thereby form corrected data, and output the corrected data.

In one embodiment, the coding unit is arranged to, if it determines that the data read from memory does not contain an error, output the data read from memory.

The coding unit may be arranged to perform the same processing of the data read from memory during the error detection operation as it performs on the first set of data during the coding operation.

The coding unit may be arranged to, during an error detection operation, treat the data read from memory as a first set of data in accordance with a coding operation and process that data in accordance with the error correction algorithm to form a second set of data.

The coding unit may be arranged to receive information data read from a first location in the memory, at which a first set of data was previously written, and parity data associated with the information data read from a second location in the memory, at which a second set of data was previously written, wherein the second set of data was previously formed from said first set of data during a coding operation.

The coding unit may be arranged to determine that data read from memory contains an error by processing the information data in accordance with the error correction algorithm to form a second set of data, comparing that second set of data with the parity data and determining that the information data contains an error if the second set of data is not identical to the parity data.

The coding unit may comprise a codeword generator arranged to receive the first set of data, multiply said data by a generator polynomial and output the result of said multiplication as the second set of data.

The coding unit may comprise a codeword generator arranged to receive the data read from memory, multiply the information data included in the read data by a generator polynomial and compare the result of said multiplication with the parity data included in the read data.

The coding unit may comprise a syndrome generator arranged to receive the data read from memory, concatenate the information data and parity data included in the read data, substitute a root of the generator polynomial into the concatenated data and sum the resulting values. In one embodiment, the coding unit is arranged to determine that the information data contains an error if the summation of the resulting values is non-zero.

The syndrome generator may be arranged to substitute a plurality of roots of the generator polynomial into the concatenated data and to sum the values resulting from each substitution, the results of each summation being indicative of the location of an error in the information data.

In one embodiment, the coding unit is arranged to, when it has determined that the data read from memory contains an error, output that information data to the error correction unit.

The error correction unit may be arranged to interleave data to be written to the memory and deinterleave data that is read from the memory.

The coding unit may be capable of detecting more than one bit error in every 256 bytes read from memory.

The error correction unit may be capable of correcting more than one bit error in every 512 bytes read from memory.

The error correction algorithm may be a Reed-Solomon code. In one embodiment, the error correction algorithm is a Cross Interleaved Reed-Solomon code.

In one embodiment, the error correction unit is a digital processor.

According to a second aspect of the disclosure, there is provided a data storage device comprising a re-writable memory, a coding unit implemented in hardware, the coding unit being capable of performing a coding operation in which it receives a first set of data to be written to the memory, processes that data in accordance with the error correction algorithm to form a second set of data and outputs the second set of data for writing to the memory, and an error detection operation in which it receives data read from the memory and processes that data in accordance with the error correction algorithm to determine whether the read data contains an error and an error correction unit implemented in software, the error correction unit being arranged to receive read data that contains an error, process that data in accordance with the error correction algorithm to correct said error and thereby form corrected data, and output the corrected data.

At least one sector of the memory that is in use for reading and/or writing of data by the processor may have an error rate of greater than one bit in 512 bytes.

The memory may be a recycled integrated memory.

The memory may have an error rate that exceeds conventionally acceptable manufacturing standards.

In one embodiment, the memory is flash memory. In one embodiment, the memory is NAND flash memory.

The memory may be such that bits of the memory are not accessible in isolation from other bits of the memory.

According to a third aspect of the disclosure, there is provided a method for processing data to be written to and data to be read from a rewritable memory comprising performing a coding operation in hardware, the coding operation comprising receiving a first set of data to be written to the memory, processing that data in accordance with the error correction algorithm to form a second set of data and outputting the second set of data for writing to the memory, performing an error detection operation in hardware, the error detection operation comprising receiving data read from the memory and processing that data in accordance with the error correction algorithm to determine whether the read data contains an error and performing an error correction operation in software, the error correction operation comprising receiving read data that contains an error, processing that data in accordance with the error correction algorithm to correct said error and outputting the corrected data.

According to a fourth aspect of the disclosure, there is provided a method for recycling a re-writable memory comprising removing the memory from a device in which it is functional and placing the memory in another device, the other device having a data processing device comprising: a coding unit implemented in hardware, the coding unit being capable of performing a coding operation in which it receives a first set of data to be written to the memory, processes that data in accordance with the error correction algorithm to form a second set of data and outputs the second set of data for writing to the memory, and an error detection operation in which it receives data read from the memory and processes that data in accordance with the error correction algorithm to determine whether the read data contains an error; and an error correction unit implemented in software, the error correction unit being arranged to receive read data that contains an error, process that data in accordance with the error correction algorithm to correct said error and thereby form corrected data, and output the corrected data.

BRIEF DESCRIPTION OF THE DRAWINGS

Various aspects of the disclosure will now be described by way of example with reference to the accompanying drawings, in which.

DETAILED DESCRIPTION

Embodiments of the disclosure provide a data processing device for use with a rewritable memory. The device is particularly suitable for use with a recycled memory that contains a large number of damaged sectors or with a manufactured memory that has too high an error rate to be sold as a normal device. The data processing device is arranged to process data to be written to and/or read from the memory in accordance with an error correction code. The data processing device advantageously splits the error coding and correcting functions between hardware and software, so that a powerful error correction code (which is necessary to deal with the data errors caused by damaged memory sectors) can be implemented without adding a substantial overhead to read and write times and without adding substantially to the processing power required of the processor. This is in contrast with many existing memory controllers, in which all data to be written to and/or read from the memory has to be processed by software.

Figure 1:
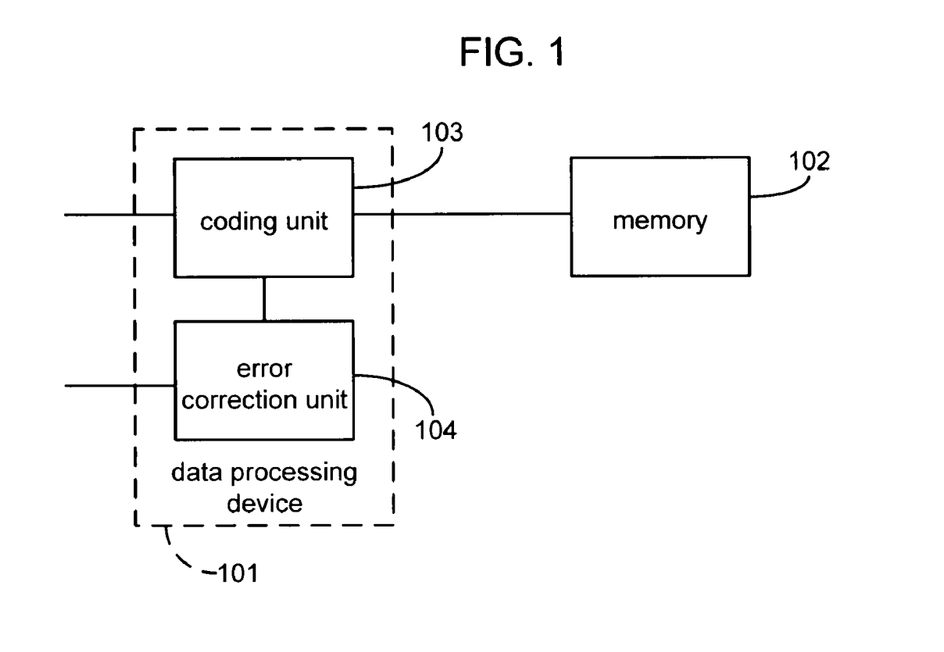
FIG. 1 shows a data processing device according to an embodiment of the disclosure.

A data processing device according to an embodiment of the disclosure is illustrated in FIG. 1. The data processing device is shown generally at 101 and is coupled to a memory 102. The data processing device comprises a coding unit 103, which is implemented in hardware, and an error correction unit 104, which is implemented in software. The error correction unit is suitably a digital processor.

The coding unit is arranged to receive data to be written to the memory. The coding unit codes the data that is to be written to the memory and outputs the resulting coded data, so that it too can be written to the memory. In one embodiment, the coding unit implements a systematic code, in which the coding process generates additional coded data (i.e., parity data) from the data to be written to memory, rather than changing the data itself.

The coding unit may output only the coded data to be written to the memory, or may output both the coded data and actual data for writing to memory. The coded data and actual data may subsequently be stored in different memory locations, i.e., the actual data need not be stored adjacent to its associated parity data.

The coding unit is also arranged to receive data read from the memory. The data should include information data read from the memory location at which the original data was written and parity data associated with that information data, e.g., data read from the location at which the coded data formed from the original data was written in the memory. The coding unit processes the data read from memory in order to detect whether it contains any errors. This processing may involve both the parity data and the information data or the parity data only. If the coding unit detects an error or errors in the data read from the memory, it passes the erroneous data to the error correction unit. If the coding unit does not detect any errors, then it may output the information data. Alternatively, the coding unit may signal to another component, e.g. a controller, coupled to the memory, that the information data may safely be output by that component.

In addition to the error coding and error detection operations described above, the coding unit may also provide hardware support for the error correction unit during the error correction operation. Some of the data processing operations required by error correction algorithms such as Reed-Solomon codes are particularly suitable for implementing in hardware. By providing the coding unit with the capability to perform some of this processing, the error correction process can be accelerated. This additional processing could include, for example, the calculation and processing of syndromes, which is described in more detail below. Such additional processing could be performed by the coding unit as soon as it determines that data read from memory contains an error and any additional data (such as syndromes) generated from that processing may be passed to the error correction unit together with the erroneous data. Alternatively, the coding unit may perform such additional processing under the control of the error correction unit, e.g., the coding unit may immediately pass any erroneous data to the error correction unit and only perform additional processing if it is forwarded appropriate data for processing by the error correction unit.

The coding unit may incorporate various specialized hardware blocks for processing data to be read to and/or read from memory. For example, the coding unit may use the same hardware block for performing the coding and error detection operations described above. Alternatively, the coding unit may be provided with duplicate hardware blocks: one for coding data being written to memory and one for detecting errors in data read from memory. The coding unit may be provided with further specialist hardware for performing any additional processing. The coding unit may be provided with different specialist hardware blocks to provide hardware support for the different error correction algorithms that may be implemented by the software of the error correction unit.

As an alternative to performing additional data processing unit in the coding unit, a separate hardware unit may be coupled to the error correction unit for any error correction processing that can be efficiently performed in hardware and thus accelerate the error correction operation.

The error correction unit is arranged to receive data from the coding unit and correct the errors contained in the information data. The data received by the error correction unit may include the information data, the parity data and optionally some further data calculated by the coding unit, e.g. syndrome data.

One of the advantages offered by this implementation (in which the error detection is performed in hardware but the error correction is performed in software) is that extra layers of complexity can be introduced into the error correction coding scheme by the processor without the hardware coding unit being aware of that extra complexity. For example, the processor may perform interleaving and deinterleaving on data to be written to and read from memory. The interleaved/deinterleaved data can be passed to the coding unit as appropriate by the processor, with the coding and error detection operations performed by the coding unit remaining the same.

A further advantage of the data processing device according to embodiments of the disclosure is that it can be used to implement a wide range of error correction schemes by changing the algorithms that are used by the processor. The basic error coding and error detection functions performed by the coding unit remain unchanged. Also, because the error detection function is performed in hardware, the impact of any extra overhead added to a read operation by changing the algorithm implemented by the processor can be minimized. This is because any added overhead should not be present in all read operations, but should be restricted to read operations in which an error is detected.

Figure 2A:
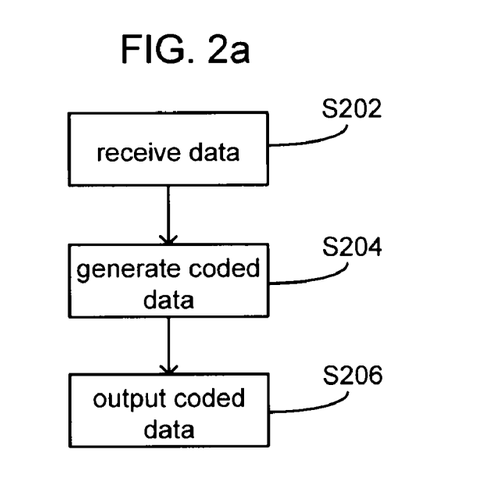
FIG. 2 shows a flowchart illustrating operation of a data processing device according to an embodiment of the disclosure.
Figure 2B:
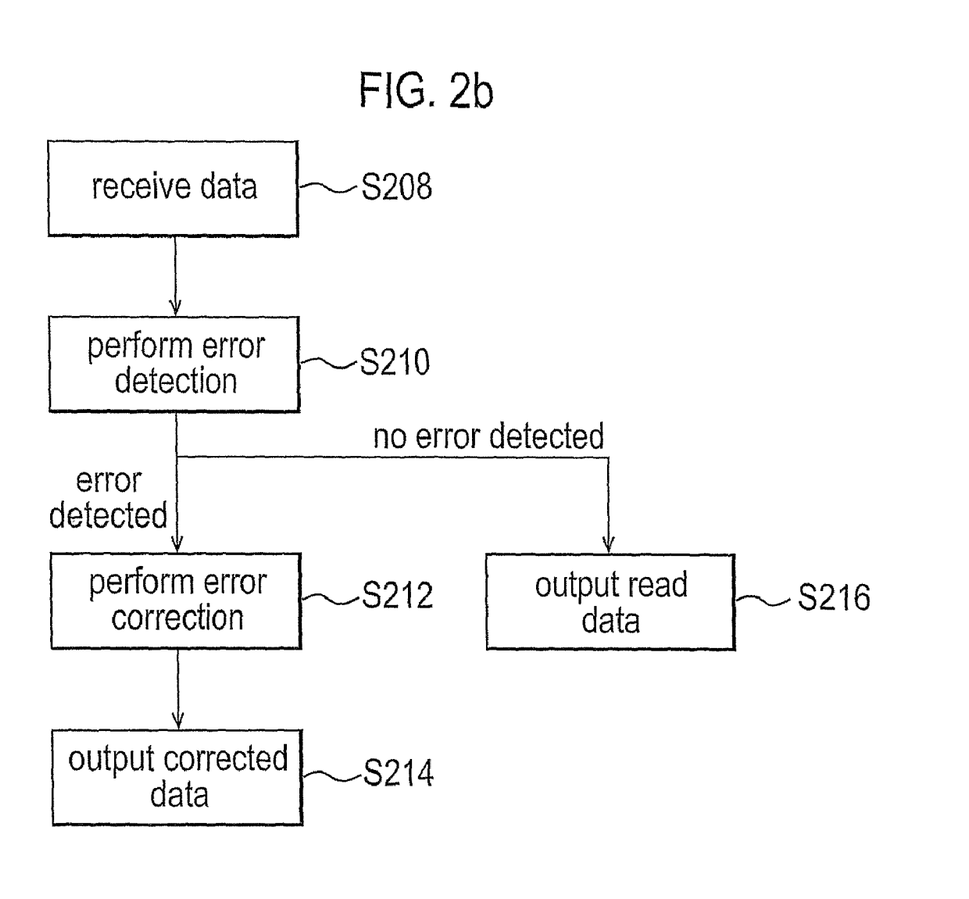

The general operation of a data processing device according to embodiments of the disclosure is shown in FIGS. 2a and 2b. FIG. 2a shows a write operation in which the data processing device receives the data to be written in step S202, processes the data in step S204 and outputs the coded data in step S206. FIG. 2b shows a read operation in which the data read from the memory is received in step S208 and is processed to determine whether or not it contains an error in step S210. If the data is determined to contain an error, then it is processed to correct that error in step S212 and the corrected data is output at step S214. If the data read from memory is determined not to contain an error in step S210, then the data read from memory is output at step S216. As explained above, the data read from memory may be output by the data processing device itself, or by another device coupled to the memory which the data processing device signals to indicate that the data read from memory can be output in its current form.

The above steps of forming coded data, detecting errors in data read from memory and correcting those errors are performed using an error correction code. As explained above, some existing memories utilize Hamming codes to introduce some simple error correction. However, this level of error correction is insufficient to deal with the number of damaged sectors present in recycled memories or in memories that having too high an error rate to be sold as normal devices. Flash memories are typically sold with up to 2% of blocks being unusable (e.g., 40 blocks in 2048). Any memories in which the percentage of unusable blocks is greater than 2% are typically rejected.

To be able to make use of older recycled flash memory, an extended error correction scheme needs to be applied for two reasons; (i) older memory types do not even have the simple Hamming code error correction included in them, and (ii) it is likely that the capability of the Hamming codes has already been exceeded (that's why it's being recycled in the first place) and the flash memory is already considered "broken".

There are many methods of performing error correction to digital data streams and all of these will involve a computational and memory overhead, some more burdensome than others. All Forward Error Correction (FEC) correction systems are complex, sophisticated and generally take considerable time and effort to develop.

Some error correction schemes that may be used by the data processing device according to embodiments of the disclosure are described below. This is for the purposes of example only and it should be understood that the disclosure is not limited to any specific coding scheme. As explained above, the data processing device according to embodiments of the disclosure may be used to implement a wide range of error correction schemes. Also, the processor may be configured to apply extra levels of error correction coding to the data written to and/or read from the memory that are not described below.

Suitable error correction schemes for use by the data processing device according to embodiments of the disclosure include Reed-Solomon error correction codes. In general, these codes involve adding parity bytes to frames of data. The parity bytes are computed in such a way that it is not only possible to determine if there has been an error, but what the error is and where it is. Within certain limits it is possible to correct several errors within a frame. This basic error correction capability can be extended by cross interleaving, in what is known as Cross Interleaved Reed-Solomon Coding (CIRC). Reed-Solomon codes in general and CIRC codes are described in more detail below, together with a description of Galois field arithmetic, which can usefully be utilized to produce hardware decoders.

Figure 3:
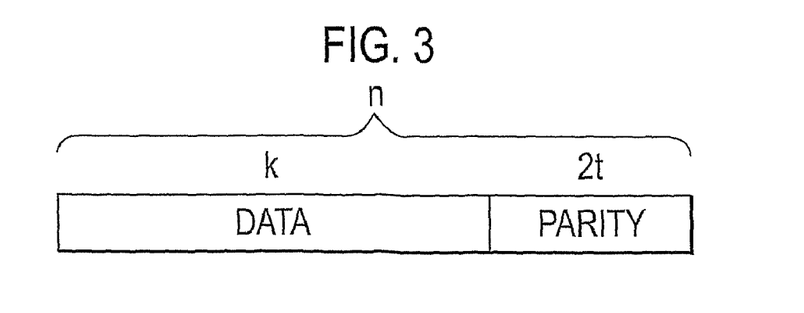
FIG. 3 shows a codeword generated by a Reed-Solomon code including the data and parity bits.

Reed-Soloman codes are error correcting codes that involve adding redundant, parity bits to a block of digital data (as shown in FIG. 3). Each Reed-Solomon code is defined as RS(n,k) with s bit symbols. This means that k data symbols of s bits each are processed to obtain redundant, parity bits that when added to the data symbols form an n symbol codeword. A Reed-Solomon decoder can detect up to 2t errors in a codeword and can correct up to t errors in a codeword, where 2t=n−k (i.e., the number of parity bits). If the position of an erroneous symbol is known, this erroneous symbol is called an erasure. A Reed-Solomon decoder can correct up to 2t erasures in a codeword.

A Reed-Solomon codeword is generated by a special polynomial known as the generator polynomial. All valid codewords are exactly divisible by the generator polynomial. The general form of the generator polynomial is given by:

$$g(x)=(x-\alpha^i)(x-\alpha^{i+1})\ldots(x-\alpha^{i+2t}) \quad (1)$$

The codeword is constructed as:

$$c(x)=g(x)\cdot i(x) \quad (2)$$

where $g(x)$ is the generator polynomial, $i(x)$ is the information block, $c(x)$ is a valid codeword and $\alpha$ is known as a primitive element.

As an example, for a Reed-Solomon code that generates six parity bits, equation 1 can be written as:

$$g(x)=(x-\alpha^0)(x-\alpha^1)(x-\alpha^2)(x-\alpha^3)(x-\alpha^4)(x-\alpha^5) \quad (3)$$

$$g(x)=x^6+g_5x^5+g_4x^4+g_3x^3+g_2x^2+g_1x+g_0 \quad (4)$$

The 2t parity symbols in a systematic Reed-Solomon codeword are given by:

$$p(x)=i(x)\cdot x^{n-k} \bmod g(x) \quad (5)$$

Figure 4:
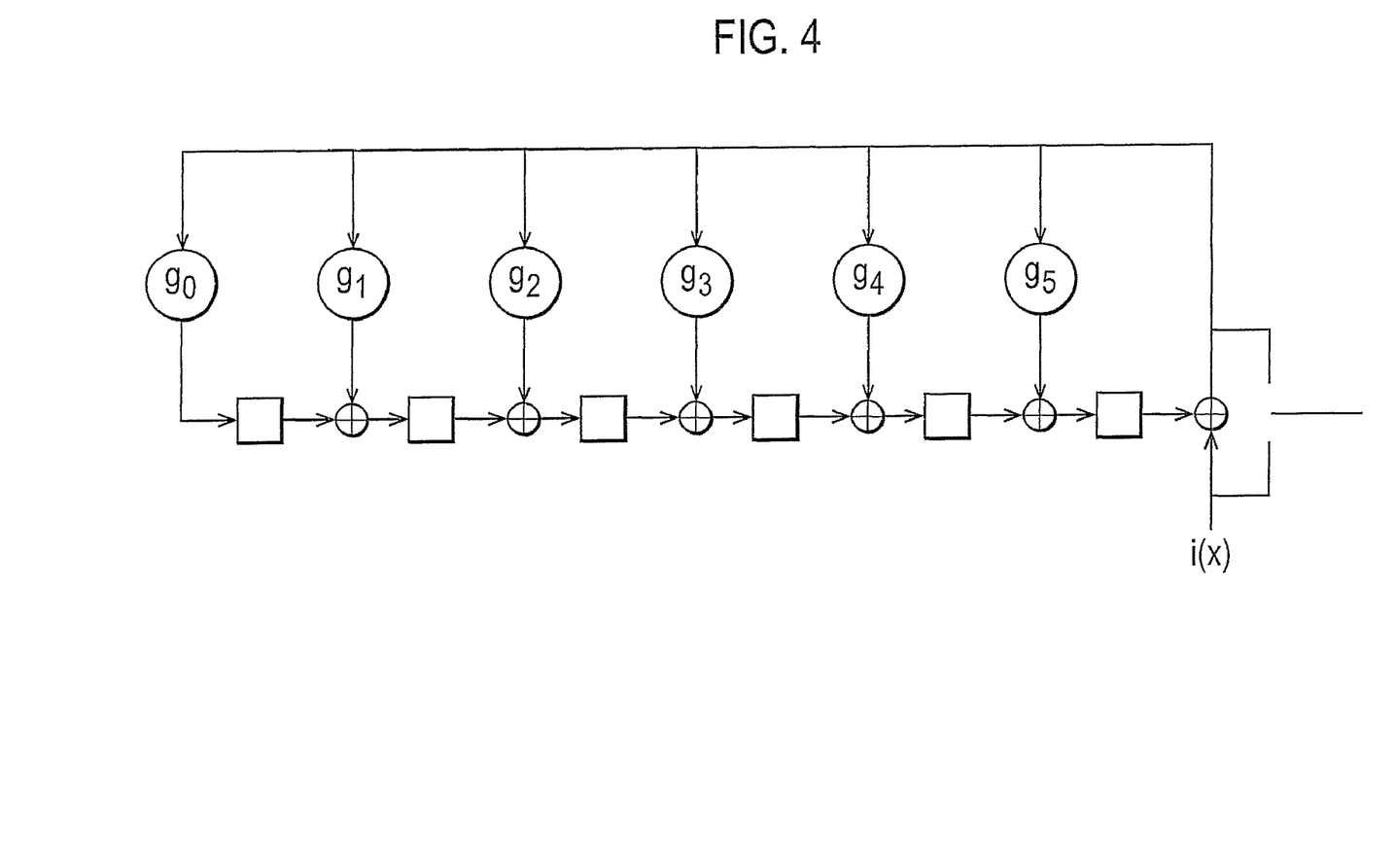
FIG. 4 shows a general architecture of a systematic encoder.

An example of an architecture for Reed-Solomon encoder is shown in FIG. 4. Each of the registers shown in the figure holds one symbol and the arithmetic operators carry out addition or multiplication on a complete symbol.

In a data processing device according to embodiments of the disclosure, the calculation of the parity bits for each block of information that is to be written to memory is performed by specialized hardware in the coding unit. Calculating the parity bits in hardware rather than using a software implementation enables the parity symbols to be calculated more quickly, thus reducing the overhead added to each write operation.

The same calculation of parity symbols may be performed by this specialized hardware in the coding unit when data is read from the memory. For example, the coding unit may receive the codeword read from memory and separate this codeword into information data and parity data. By performing the same multiplication with the generator polynomial on the information data read from memory, a new set of parity symbols can be formed. The new parity symbols can then be compared with the parity symbols read from memory to determine whether the codeword contains an error. An error in the codeword read from memory is detected if the newly calculated parity symbols do not match those read from the memory. This may be achieved by subtracting the newly formed parity symbols from the parity symbols read from memory. If the result of the subtraction is non-zero, then it can be determined that the codeword read from memory contains an error.

As explained above, the parity symbols and data symbols that comprise a particular codeword need not be stored as contiguous data in the memory. Therefore, the location at which the parity data associated with a particular information block is stored in the memory should be recorded together with the location of the information block so that, when that information block is read from memory, the parity data associated with that information is also read. In this way a complete codeword can be passed to the coding unit for error detection.

If the processing performed by the coding unit on the data read from memory indicates that there is an error in the codeword, that codeword is then passed directly to the error correction unit for processing in software. The task of correcting any errors in a codeword is more onerous than that of detecting them, and for this reason it is a task that may be advantageously performed in software by the error correction unit. In some implementations, the coding unit may accelerate the software by performing some additional processing of an erroneous codeword. For example, the coding unit may advantageously generate "syndromes" from a codeword read from memory. Syndromes are described in more detail below.

"Syndromes" are generated by substituting roots of the generator polynomial into the codeword read from memory. Summing the symbols generated by each substitution (i.e., for each root of the generator polynomial) generates the syndrome. Each of the syndromes for a correct codeword should be zero. If a syndrome is non-zero, this indicates that the codeword contains an error. As there are 2t roots of the generator polynomial, there are also 2t syndromes of each codeword. Each syndrome depends only on the errors in each codeword. These syndromes can be used both to detect errors and to determine the location of errors in the codeword.

Figure 5:
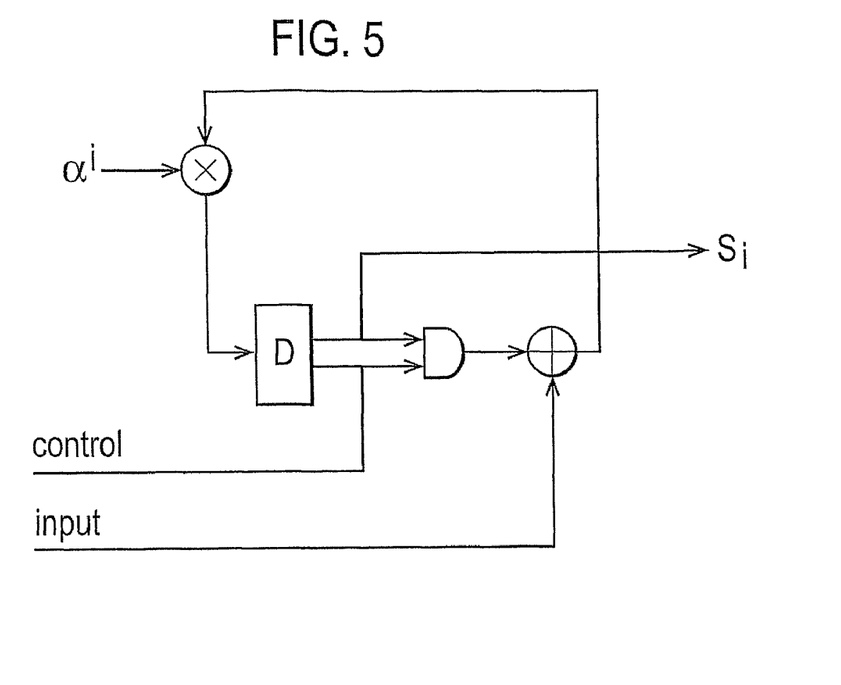
FIG. 5 shows a general architecture of a syndrome calculator.

As syndromes can be used both to detect and to correct errors, in some embodiments of the disclosure, the coding unit may advantageously be arranged to calculate syndromes from a codeword read from memory instead of calculating parity data. The coding unit is then able to detect that a codeword read from memory contains an error by calculating the 2t syndromes of that data and determining whether any of the syndromes is non-zero. If an error is detected, the erroneous codeword and its associated syndromes are passed to the error correction unit by the coding unit. This is particularly efficient embodiment of the disclosure as the syndrome data calculated by the coding unit in order to detect an error is then used by the error correction unit to correct any detected errors. The coding unit according to such an embodiment of the disclosure may be provided with different hardware blocks: one block for calculating parity data during a coding operation and one block for calculating syndromes during an error detection operation. A general architecture that is suitable for calculating syndrome data is shown in FIG. 5. Typically, a coding unit would be provided with 2t of these architectures: one for calculating each syndrome of a codeword. This enables the syndromes of an individual codeword to be calculated in parallel.

It can be seen from equation 3 above that since each root of the generator polynomial differs by a power of the primitive element $\alpha$, so each of the syndromes also differs by a power of the primitive element $\alpha$ (this can also be seen from equation 7 below). Therefore, the location of an error can be determined by dividing the syndromes and taking logs. Such calculations are well-suited to hardware implementations which can exploit the simplifications that are available using Galois field arithmetic.

In Galois field arithmetic, each bit of a byte is regarded as a modulo 2 coefficient of a power of a primitive. When dealing with the syndromes described above, this primitive is the primitive $\alpha$ of the generator polynomial.

One advantage of this treatment of the data is that data can be added, subtracted, multiplied and divided and the result is always in the field i.e., byte wide. This means that error detection or correction codes, which are a mathematical combination of the data bytes, will always be byte wide irrespective of the actual data.

The members of the Galois field can be generated with a shift register with feedback much like a pseudo random number generator. In CDs, the shift register shifts from LSB to MSB and when there is a carry out the value 1Dh is XOR'd into the byte. The first members of the Galois field, in hexadecimal, are therefore:—

1, 2, 4, 8, 10, 20, 40, 80, 1D, 3A, 74, E8, CD . . .

The cycle repeats after 255 shifts. Mathematically each shift is regarded as a multiplication of $\alpha$, so each member of the field can be regarded as a power of $\alpha$. It should be noted that zero is not a member of the field. This is not surprising for two reasons. Zero in the shift register always yields zero no matter how many shifts. No power of $\alpha$ can be zero. On occasions zero must be treated as a special case.

Addition and subtraction of two members of the field are identical. The result is the XOR (exclusive or) of the two bytes. This is because each bit is a modulo two coefficient.

Multiplication and division are slightly more complicated. As each member can be regarded as a power of $\alpha$, it is possible to take the log of any member. The log is the position in the above sequence, i.e., the number of shifts or the power of $\alpha$, so the log of 1 is 0 and the log of 3A is 9. In order to multiply or divide two bytes one may first take the log of each number then either add or subtract the logs then raise a to this power to get the result.

There is a further complication with multiplication and division because there are only 255 members in the field. This means that when adding or subtracting logs it should be done modulo 255.

The error correcting power of the Reed-Solomon codes described above can be increased by employing interleaving. This results in the Cross Interleaved Reed-Solomon Code (CIRC) is a powerful error correction algorithm.

Figure 6:
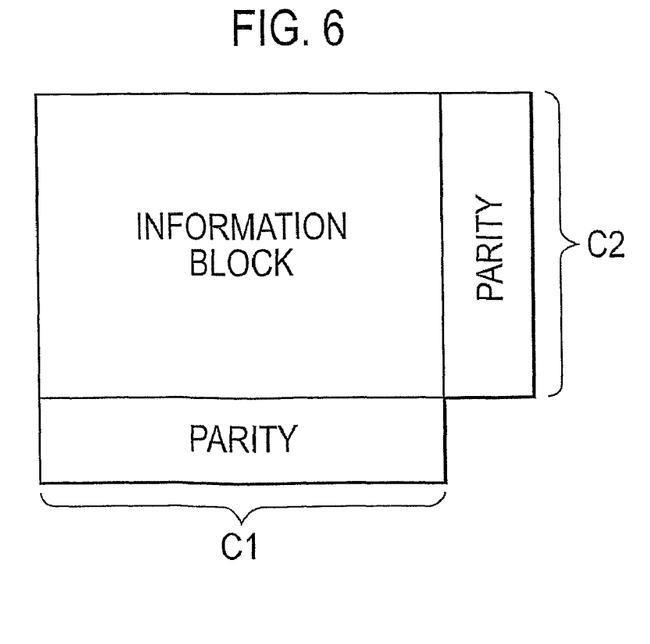
FIG. 6 shows data bits and parity bits arranged in accordance with a Cross-interleaved Reed-Solomon code.

The basic error correction capability of a Reed-Solomon code can be extended by cross interleaving. This essentially means arranging the data into a two dimensional array and computing independent parity bytes for rows and columns. This means that a burst error, which one would expect from defective sectors of the memory, affects many contiguous bytes in one dimension only affects one or two bytes per frame in the other dimension. Such an array is shown in FIG. 6.

The frame in the "vertical" or column direction is referred-to as C1 and contains 32 bytes, four of which are parity. The frame in the "horizontal" or row direction is referred-to as C2 and contains 28 bytes, four of which are parity. After processing C1 and C2, 24 data bytes remain. These are equivalent to six stereo samples.

The parity bytes for both C1 and C2 are computed in much the same way. C1 parity is computed such that the following equations hold true.

$$d_0+d_1+d_2\ldots+d_{31}=0 \quad (6)$$

$$d_0\cdot\alpha^{31}+d_1\cdot\alpha^{30}+d_2\cdot\alpha^{29}\ldots+d_{31}\cdot\alpha^0=0 \quad (7)$$

$$d_0\cdot\alpha^{62}+d_1\cdot\alpha^{60}+d_2\cdot\alpha^{58}\ldots+d_{31}\cdot\alpha^0=0 \quad (8)$$

$$d_0\cdot\alpha^{93}+d_1\cdot\alpha^{90}+d_2\cdot\alpha^{87}\ldots+d_{31}\cdot\alpha^0=0 \quad (9)$$

The symbols $d_0$ to $d_3$, are the bytes in the frame. C2 is slightly different because there are only 28 bytes so the powers of alpha are reduced accordingly.

The data can be checked quickly using the syndrome generator logic. This logic contains four accumulators. When a byte is written to the syndrome logic, the previous value in each of the accumulators is multiplied by 1, $\alpha^1$, $\alpha^2$ and $\alpha^3$, respectively, and then added to the new byte. This efficiently performs the above calculation irrespective of the size of the frame.

If the data is correct, then the values in the accumulators, known as the syndrome, will all be zero. If the syndrome is non zero then the syndrome can be used to correct the error in one of three ways: single error correction, double error correction and four erasure correction, described below.

Rather than calculating a new set of parity data from data read from memory to determine whether that data contains any errors, the coding unit could be arranged to calculate a syndrome of the received codeword. If the syndrome is non-zero, then an error is detected.

Single Error Correction

If there is just one error in, say, $d_5$ then the four syndrome bytes are given by:

$$s_0 = e \tag{10}$$

$$s_1 = e \cdot \alpha^{31-5} \tag{11}$$

$$s_1 = e \cdot \alpha^{62-10} \tag{12}$$

$$s_1 = e \cdot \alpha^{93-15} \tag{13}$$

where e is the difference between the correct value of $d_5$ and the recovered value.

The error is given by $s_0$. Its position can be determined by dividing $s_1$ by $s_0$ and extracting the power of alpha by taking logs. It is possible that more than one error could masquerade as a single error. A high degree of confidence can be gained by computing the location again using $s_2$ and $s_3$. These must be consistent and in the range 0-31. There is then only a 1 in 524,288 chance of miss-correction.

Double Error Correction

There is enough information in the syndrome bytes to identify the value and position of two errors. The algorithms are relatively complicated. The Peterson-Berlekamp algorithm can be used to find what is called the locator polynomial. Once the locator polynomial has been evaluated the roots of the polynomial must be found. This may be achieved using the Chien search method. The locator polynomial may also be found using the Euclidean algorithm. This algorithm is typically less efficient than Peterson-Berlekamp, but is more suited to a hardware solution.

There is a one in thirty two chance of a miss-correction with a double error. However, the low confidence level provided by two error corrections at C1 is improved by the double check provided at C2.

Where two errors are present in a codeword the first two syndromes are as follows:

$$s_0 = e_0 + e_1 \tag{14}$$

$$s_1 = e \cdot \alpha^{31-L_0} + e_1 \cdot \alpha^{31-L_1} \tag{15}$$

Here $L_0$ and $L_1$ are the locations of the errors that are known. This can be solved for $e_0$ and $e_1$ as follows:

$$e_0 = \frac{s_0}{(\alpha^{31-L_0} + s_0 \cdot \alpha^{31-L_1})} \tag{16}$$

$$e_1 = s_0 + e_0 \tag{17}$$

Note that subtraction is equivalent to addition in solving these equations.

Four Erasure Correction

As explained above, an erasure is the name given to an error in a frame where the location of the error is known but its value is not. This happens when a column of data is flagged bad at the C1 stage and then, when the same data is processed at the C2 stage, only an individual byte is marked bad. The flagged column translates to the error location. C2 can correct up to four erasures so four contiguous columns could be in error. This capability is further enhanced by a factor of four by skewing the data so that consecutive row data comes from columns four apart. Thus, 16 consecutive erroneous frames could be corrected.

The syndrome for a frame with four errors is given by the following equations:

$$s_0 = e_0 + e_1 + e_2 + e_3 \tag{18}$$

$$s_1 = e_0 \cdot \alpha^{27-L_0} + e_1 \cdot \alpha^{27-L_1} + e_2 \cdot \alpha^{27-L_2} + e_3 \cdot \alpha^{27-L_3} \tag{19}$$

$$s_2 = e_0 \cdot \alpha^{54-2 \cdot L_0} + e_1 \cdot \alpha^{54-L_1} + e_2 \cdot \alpha^{54-2 \cdot L_2} + e_3 \cdot \alpha^{54-2 \cdot L_3} \tag{20}$$

$$s_3 = e_0 \cdot \alpha^{81-3 \cdot L_0} + e_1 \cdot \alpha^{81-3 \cdot L_1} + e_2 \cdot \alpha^{81-3 \cdot L_2} + e_3 \cdot \alpha^{81-3 \cdot L_3} \tag{21}$$

The values $L_0, L_1, L_2$ and $L_3$ are given by the flags from C1. There are therefore four linear equations with four unknowns: $e_0, e_1, e_2$ and $e_3$ and can be solved in a number of ways. One approach is to think of the equations as a matrix:

$$\begin{pmatrix} s_0 \\ s_1 \\ s_2 \\ s_3 \end{pmatrix} = \begin{pmatrix} 1 & 1 & 1 & 1 \\ \alpha^{27-1 \cdot L_0} & \alpha^{27-1 \cdot L_1} & \alpha^{27-1 \cdot L_2} & \alpha^{27-1 \cdot L_3} \\ \alpha^{54-2 \cdot L_0} & \alpha^{54-2 \cdot L_1} & \alpha^{54-2 \cdot L_2} & \alpha^{54-2 \cdot L_3} \\ \alpha^{81-3 \cdot L_0} & \alpha^{81-3 \cdot L_1} & \alpha^{81-3 \cdot L_2} & \alpha^{81-3 \cdot L_3} \end{pmatrix} \times \begin{pmatrix} e_0 \\ e_1 \\ e_2 \\ e_3 \end{pmatrix} \tag{22}$$

By scaling rows and subtracting one row from another the matrix can be transformed into the identity matrix.

$$\begin{pmatrix} s'_0 \\ s'_1 \\ s'_2 \\ s'_3 \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \times \begin{pmatrix} e_0 \\ e_1 \\ e_2 \\ e_3 \end{pmatrix} \tag{23}$$

The errors are then equal to the modified syndrome bytes. The code may use certain shortcuts for speed. When a coefficient would reach its final value, there is no need to compute or store that value as it is no longer needed.

If there are fewer than four errors then dummy locations outside the frame can be created to make it up to four. Dedicated code to cope with one, two and three erasures could be provided as this would tend to be faster on individual frames. However, the system has to work with continuous four erasure frames and so there would typically be no system advantage to providing such dedicated codes. A final syndrome check on the corrected frame should be performed.

If only the second stage of error correction is used, then this, in conjunction with the de-interleaving buffer, would allow up to 4096 contiguous bits in error to be corrected without a single bit of the erroneous data being found by the host CPU. This is 4096 times better than the current error correction and without the enormous overhead that might be expected by casual inspection.

In the typical flash memory error correction algorithms used by memory suppliers, the redundancy is 16 bytes in every 512, thus 3.1% of the data stored to the flash memory is the error correction overhead. In a system based upon CIRC, this redundancy level rises to 12.5% (when only using C2). However, this is for a 4096:1 increase in the error correction capacity. The CIRC error correction can also re-use the extra space available from the now-unused Hamming code system which takes the data redundancy down to only 9.4%.

As a method of further improving the error correction capabilities, it is possible to additionally interleave the data to allow multiple sectors to be corrected. If, for example, the data was written to the memory device with the data interleaved over 4 sectors, then the error correction system could be able to fully recover the data from 4 consecutive sectors that were completely corrupted. This extra interleaving comes at the cost of extra memory being required to process the data, but clearly can be extended to permit the maximum length of the correctable data to be extended to any length given sufficient working memory in the CPU.

Figure 7:
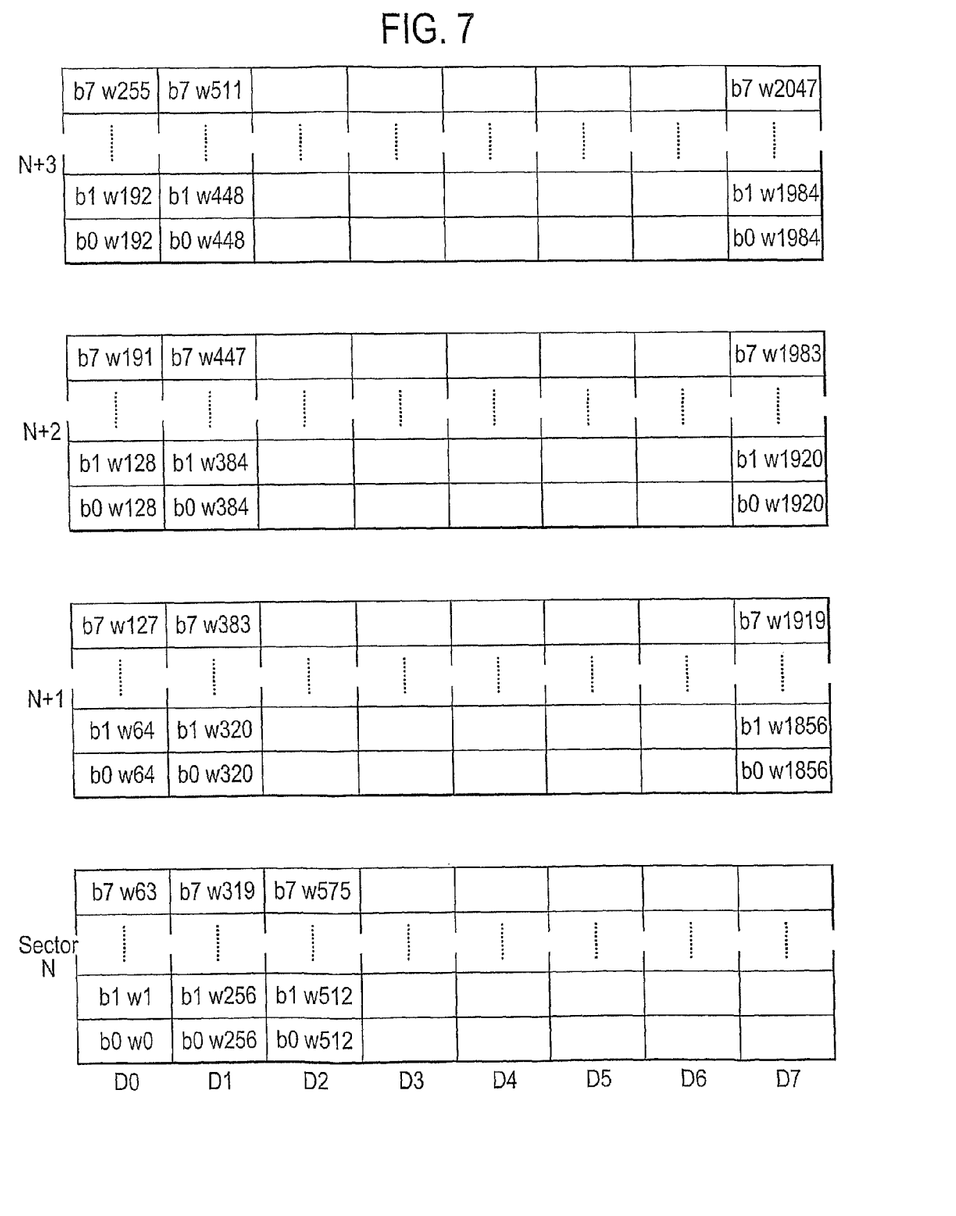
FIG. 7 shows interleaved data that allows multiple sectors to be corrected.

FIG. 7 shows the increased interleaving structure when operated over four 512 byte sectors of a typical NAND flash memory. In the figure, "bn" is the bit number and "wn" is the word number. In this case the words are 8 bits long.

The processing overhead for a complete encode and decoder should be less than 1 to 4 MIPS for a typical 128 kbps MP3 file depending on the level of errors found in the data and the total memory use would be approximately 1.5 Kbytes.

The processor of the data processing device according to embodiments of the disclosure may make use of existing instructions present in a CD data decoder. This can help to accelerate the data correction process.

The described error correction not only allows recycled flash memory to be used, but also the lifetime of flash products can also be considerably increased without the need for costly silicon solutions aboard the flash memory device.

The data processing device according to embodiments of the disclosure is particularly advantageous when used together with memories that contain a large number of damaged sectors, such as recycled memories or manufactured memories that have too high an error rate for normal sale, and which would otherwise be manufacturing rejects. The data processing device is not limited, however, to implementations in which it is coupled to such damaged memories. It may be beneficially used in any implementation in which it is desired to implement a powerful error correction code without incurring the read and write overhead that implementing such an error correction code in software alone would typically entail.

The data processing device according to embodiments of the disclosure has been described above with specific reference to flash memory. However, this technology is equally applicable to DRAM or any other type of solid state memory device.

The data processing device according to the disclosure may be advantageously incorporated into a wide range of consumer electrical products, such as CD players, digital audio players, digital cameras, mobile phones, and the like.

Each of the individual feature described herein may be used in isolation or in any combination of two or more such features to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. Aspects of the present disclosure may include any of such individual feature or combination of features. In view of the foregoing description it will be evident to a person skilled in the art that various modifications may be made within the scope of the disclosure.

The invention claimed is:

1. A method for recycling a rewriteable memory of an integrated circuit removed from a first device in which the rewritable memory functioned, the integrated circuit comprising an integrated error corrector configured to provide the rewriteable memory with error correction, the method comprising:
   placing the rewriteable memory in a second device having a data processing device comprising an extended error corrector configured to apply an extended error correction algorithm to data written to and read from the rewriteable memory, wherein the extended error corrector is configured to detect and correct at least one error not corrected by the integrated error corrector of the integrated circuit.

2. The method as claimed in claim 1, wherein the extended error corrector comprises:
   a coding unit configured to perform:
      a coding operation in which the coding unit receives a first set of data to be written to the rewriteable memory, processes that data in accordance with the extended error correction algorithm to form a second set of data, and outputs the second set of data for writing to the rewriteable memory, and
      an error detection operation in which the coding unit receives data read from the rewriteable memory and processes the read data in accordance with the extended error correction algorithm to determine whether the read data contains an error; and
   an error correction unit configured to receive from the coding unit read data determined to contain an error and to process the received read data in accordance with the extended error correction algorithm to correct said error and form corrected data.

3. The method as claimed in claim 2, wherein the coding unit multiplies the first set of data by a generator polynomial to form the second set of data.

4. The method as claimed in claim 2, wherein the read data from the rewritable memory includes information data and parity data, and wherein the coding unit multiplies the information data by a generator polynomial to form a result and compares the result with the parity data.

5. The method as claimed in claim 4, wherein the coding unit concatenates the information data and the parity data, substitutes a root of the generator polynomial into the concatenated data to form values, and sums the values to form a syndrome.

6. The method as claimed in claim 5, wherein the coding unit determines that the information data contains an error if the syndrome is non-zero.

7. The method as claimed in claim 6, wherein the coding unit substitutes a plurality of roots of the generator polynomial into the concatenated data to form multiple syndromes, and wherein the syndromes are indicative of a location of an error in the information data.

8. The method as claimed in claim 1, wherein the extended error corrector applies a Reed-Solomon error correction algorithm to detect and correct errors.

9. A rewriteable memory recycling device comprising:
   coupling means configured to receive an integrated circuit removed from a device in which the integrated circuit functioned, the integrated circuit including a data storage means to be recycled and an integrated error correction means configured to provide the data storage means with error correction;
   an extended error correction means configured to correct data storage errors of the data storage means, wherein the extended error correction means is configured to correct at least one error not corrected by the integrated error correction means of the integrated circuit.

10. The rewriteable memory recycling device as claimed in claim 9, wherein a portion of the extended error correction means is implemented in hardware, and wherein another portion of the extended error correction means is implemented in software.

11. A rewriteable memory recycling device, comprising:
   a coupler configured to receive an integrated circuit removed from a device in which the integrated circuit functioned, the integrated circuit including a rewriteable memory to be recycled and an integrated error corrector configured to provide the rewriteable memory with error correction, the rewriteable memory including an error not correctable by the integrated error corrector; and an extended error corrector configured to apply an extended error correction algorithm to data written to and data read from the rewriteable memory, wherein the extended error corrector is configured to detect and correct the error not correctable by the integrated error corrector of the integrated circuit.

12. The rewriteable memory recycling device as claimed in claim 11, wherein the extended error corrector comprises:
a coding unit configured to perform:
a coding operation in which the coding unit receives a first set of data to be written to the rewriteable memory, processes that data in accordance with the extended error correction algorithm to form a second set of data, and outputs the second set of data for writing to the rewriteable memory, and
an error detection operation in which the coding unit receives data read from the rewriteable memory and processes the read data in accordance with the extended error correction algorithm to determine whether the read data contains the error not correctable by the integrated error corrector; and
an error correction unit configured to receive from the coding unit read data determined to contain the error and to process the received read data in accordance with the extended error correction algorithm to correct the error and form corrected data.

13. The rewriteable memory recycling device as claimed in claim 12, wherein the coding unit is configured to perform the same processing of the data read from the rewriteable memory during the error detection operation as it performs on the first set of data during the coding operation.

14. The rewriteable memory recycling device as claimed in claim 12, wherein the coding unit is configured to receive information data read from a first location in the rewritable memory and parity data associated with the information data and read from a second location in the memory.

15. The rewriteable memory recycling device as claimed in claim 14, wherein the coding unit is configured to determine that the data read from the rewriteable memory contains the error by:
processing the information data in accordance with the extended error correction algorithm to form a third set of data;
comparing the third set of data with the parity data; and
determining that the third set of data is not identical to the parity data.

16. The rewriteable memory recycling device as claimed in claim 12, wherein the coding unit comprises a codeword generator configured to receive the first set of data and multiply the first set of data by a generator polynomial to produce the second set of data.

17. The rewriteable memory recycling device as claimed in claim 16, wherein the read data received from the rewriteable memory includes information data and parity data, and wherein the codeword generator is configured to:
receive the information data and the parity data;
multiply the information data by a generator polynomial to produce a result; and
compare the result with the parity data included in the read data.

18. The rewriteable memory recycling device as claimed in claim 17, wherein the coding unit comprises a syndrome generator configured to:
receive the information data and parity data included in the read data;
concatenate the information data and parity data to produce concatenated data;
substitute a root of the generator polynomial into the concatenated data to produce resulting values; and
sum the resulting values.

19. The rewriteable memory recycling device as claimed in claim 18, wherein the coding unit is configured to determine that the information data contains an error if the summation of the resulting values is non-zero.

20. The rewriteable memory recycling device as claimed in claim 19, wherein the syndrome generator is arranged to substitute a plurality of roots of the generator polynomial into the concatenated data and to sum the values resulting from each substitution, and wherein the resulting values of each summation are indicative of a location of an error in the information data.

21. The rewriteable memory recycling device as claimed in claim 12, wherein the coding unit is configured to detect more than one bit error in at least every 256 bytes read from the rewriteable memory.

22. The rewriteable memory recycling device as claimed in claim 12, wherein the extended error correction algorithm is a Reed-Solomon error correction algorithm.

23. The rewriteable memory recycling device as claimed in claim 12, wherein the error correction unit is a digital processor.

24. The rewriteable memory recycling device as claimed in claim 12, wherein the rewritable memory has sectors, and wherein at least one of the sectors that is in use for reading and/or writing of data has an error rate of greater than one bit in 512 bytes.

25. The rewriteable memory recycling device as claimed in claim 12, wherein the rewritable memory has an error rate that exceeds conventionally acceptable manufacturing standards.

* * * * *

UNITED STATES PATENT AND TRADEMARK OFFICE
CERTIFICATE OF CORRECTION

PATENT NO. : 8,140,939 B2
APPLICATION NO. : 11/913259
DATED : March 20, 2012
INVENTOR(S) : Colmer et al.

It is certified that error appears in the above-identified patent and that said Letters Patent is hereby corrected as shown below:

On the Title Page, in Field (57), under "ABSTRACT", in Column 2, Line 6, delete "capable" and insert -- capable of --, therefor.

In Column 8, Line 5, in Equation 1, delete "$(x-\alpha^{i+2}t)$" and insert -- $(x-\alpha^{i+2t})$. --, therefor.

In Column 10, Line 51, delete "do to $d_3$," and insert -- $d_0$ to $d_{31}$ --, therefor.

In Column 12, Lines 7-9, in Equations 20-21, delete "
$$s_2 = e_0 \cdot \alpha^{54-2.L_0} + e_1 \cdot \alpha^{54-L_1} + e_2 \cdot \alpha^{54-2.L_2} + e_3 \cdot \alpha^{54-2.L_3}$$

$$s_3 = e_0 \cdot \alpha^{81-3.L_0} + e_1 \cdot \alpha^{81-3.L_1} + e_2 \cdot \alpha^{81-3.L_2} + e_3 \cdot \alpha^{81-3.L_3}$$
" and insert --
$$s_2 = e_0 \cdot \alpha^{54-2.L_0} + e_1 \cdot \alpha^{54-2.L_1} + e_2 \cdot \alpha^{54-2.L_2} + e_3 \cdot \alpha^{54-2.L_3}$$

$$s_3 = e_0 \cdot \alpha^{81-3.L_0} + e_1 \cdot \alpha^{81-3.L_1} + e_2 \cdot \alpha^{81-3.L_2} + e_3 \cdot \alpha^{81-3.L_3}$$
--, therefor.

In Column 12, Line 24, delete "matrix." and insert -- matrix: --, therefor.

In Column 13, Line 9, delete "encode" and insert -- encoder --, therefor.

Signed and Sealed this
Fourteenth Day of August, 2012

David J. Kappos
*Director of the United States Patent and Trademark Office*